2,960,436
SYNTHESIS OF STEROIDS BY *DIPLODIA NATALENSIS*

Richard W. Thoma, Somerville, and Josef Fried, Princeton, N.J., assignors to Olin Mathieson Chemical Corporation, New York, N.Y., a corporation of Virginia No Drawing. Filed Nov. 23, 1959, Ser. No. 854,552

6 Claims. (Cl. 195—51)

This application is a continuation-in-part of Serial No. 567,478, filed on February 24, 1956.

This invention relates to, and has for its object the provision of a method for the microbial 7α-hydroxylation of steroids of the androstane and pregnane series.

The method of this invention comprises subjecting a 7-unsubstituted steroid of the androstane or pregnane series to the action of enzymes of the microorganism *Diplodia natalensis* under oxidizing conditions. The 7α-hydroxy derivative which is thereby produced corresponds to the steroid starting material except that it contains an hydroxyl radical in the 7α-position. The hydroxylation can best be effected by either including the steroid in an aerobic culture of *Diplodia natalensis*, or by bringing together, in an aqueous medium, the steroid, air and enzymes of non-proliferating cells of the microorganism.

In general, the conditions of culturing *Diplodia natalensis* for the purposes of this invention are (except for the inclusion of the steroid to be converted) the same as those of culturing various other molds for the production of antibiotics and/or riboflavin, i.e., the microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period may vary considerably, the range of about 6 to 96 hours being feasible, but not limiting.

Any steroid of the androstane and pregnane series, unsubstituted in the 7-position may be 7α-hydroxylated by the process of this invention. Among the steroids of the androstane series can be mentioned androstane-3,17-dione, Δ⁴-androstene-3,17-dione, Δ¹,⁴-androstadiene-3,17-dione, testosterone, 9α-fluoro-11β-hydroxy-17α-methyl testosterone, and 17α-methyl-testosterone. Among the steroids of the pregnane series can be mentioned pregnane-3,20-dione and the steroids of the 4-pregnene and 1,4-pregnadiene series especially those having the following general formula:

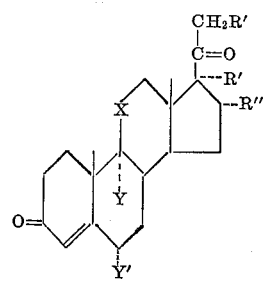

or the 1,2-unsaturates thereof wherein X is

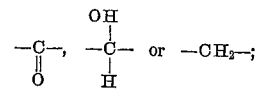

Y is hydrogen or halo; Y' is hydrogen, halo or methyl; R' is hydrogen, hydroxy or the acyloxy radical of a hydrocarbon carboxylic acid of less than ten carbon atoms, and R" is hydrogen, hydroxy, the acyloxy radical of a hydrocarbon carboxylic acid of less than ten carbon atoms, or lower alkyl. Among such Δ⁴-pregnanes and 1,4-pregnadienes may be mentioned progesterone, cortisone, cortexolone, hydrocortisone, Δ¹,⁴-pregnadiene-17α, 21-diol-3,20-dione, desoxycorticosterone, 9α-fluorohydrocortisone, triamcinolone, dexamethasone, and 9α-fluoroprednisolone.

The process of this invention yields as final products the 7α-hydroxy derivatives of the steroid substrates. These final products are steroids which may be used as intermediates in the preparation of other useful steriods and also (if they contain the Δ⁴-3-keto configuration) possess pharmaceutical activity in their own right. Thus, as stated in parent application, Serial No. 567,478, 7α-hydroxy-cortexolone (7α-hydroxy-Compound S) in addition to being an active mineralocorticoid is also useful for the preparation of Δ⁴-androstene-7α-ol-3,17-dione, a compound possessing protein anabolic and androgenic activity, to which end the 7α-hydroxy-cortexolone is subjected to oxidation in an acid medium with a bismuthate salt such as sodium bismuthate.

The final products prepared by the 7α-hydroxylation process of this invention may be alternatively dehydrated thereby preparing 6-dehydro derivatives, which in the case of 3-keto-Δ⁴,⁶-pregnadiene derivatives have mineralocorticoidal activity. The dehydration may be accomplished in the usual manner as by treatment with a base, e.g., methanolic potassium hydroxide, for a period sufficient to effect the desired conversion. Thus, Δ⁴,⁶-pregnadiene-17α-21-diol-3,20-dione, a compound having mineralocorticoidal activity, can be prepared from Δ⁴-pregnene-7α,17α,21-triol-3,20-dione by treating the latter with methanolic potassium hydroxide.

The following examples illustrate this invention:

EXAMPLE 1

*Preparation of $\Delta^4$-pregnene-7α,17α,21-triol-3,20-dione*

A fermentation medium of the following composition is prepared:

| | G. |
|---|---|
| Dextrose | 10 |
| Corn steep liquor | 6 |
| $NH_4H_2PO_4$ | 3 |
| $CaC_3$ | 2.5 |
| Yeast extract | 2.5 |
| Soybean oil | 2.2 |

Distilled water to make one liter.

The pH of the medium is adjusted to 7.0±0.1 with 2 N NaOH solution, and 50 ml. portions of the medium are distributed in six 250 ml. flasks, the flasks plugged with cotton and sterilized by autoclaving for 30 minutes at 120° C. When cool, each of the flasks is inoculated with 1.0 ml. of a suspension prepared by using 7.0 ml. of water (with 0.01% Duponol as wetting agent) to suspend the sporulated growth of a 3-month old Sabouraud dextrose agar slant (4 parts dextrose, 1 part neopeptone and 1.5 parts agar to 100 parts water) culture of *Diplodia natalensis* ATCC No. 9055 or derived strains; the parent organism is obtainable, inter alia, from the American Type Culture Collection, Washington, D.C.

The flasks are then mechanically shaken for 69 hours at 25° C. on a 280 cycle per minute rotary shaker, after which about 9% (v./v.) is transferred to each of 51 flasks containing 50 ml. of the same medium. After 48 hours incubation, a total of 638 mg. of $\Delta^4$-pregnene-17α,21-diol-3,20-dione in 25.5 ml. of methanol (to give 0.25 mg. of steroid per ml. in the fermentation vessel) is added. The flasks are then incubated an additional 24 hours, after which the flasks are harvested, and the contents filtered through a Seitz pad and washed with water to give a final volume of filtrate and washings of 2480 ml.

The culture filtrate (2480 ml.) is extracted with three 1500 ml. portions of chloroform and the combined extracts evaporated to dryness in vacuo. The crystalline residue (about 438 mg.) is washed with hexane and recrystallized from 95% alcohol. 125 mg. of $\Delta^4$-pregnene-7α,17α,21-triol-3,20-dione is obtained, which melts at about 245–247° C. and which after additional recrystalization, melts at about 248–250° C.; $[\alpha]_D^{24}$ +97° (c., 0.3 in 95% alcohol);

$\lambda_{max}^{alc.}$ 241 mμ (ε=16,000); $\lambda_{max}^{Nujol}$ 2.90μ, 3.00μ, 3.08μ (OH), 5.91μ (20-keto), 6.10μ and 6.20μ ($\Delta^4$-3-keto)

*Analysis.*—Calc'd for $C_{21}H_{30}O_6$ (362.45): C, 69.58; H, 8.34. Found: C, 69.76; H, 8.41.

EXAMPLE 2

*Preparation of 7α-hydroxyprogesterone*

One ml. portions of 0.01% Duponol suspension of growth from a 16-day old malt agar slant of *Diplodia natalensis* (ATCC 9055) are used to inoculate 250 ml. flasks each containing 50 ml. of the fermentation medium of Example 1. The flasks are incubated for 69 hours at 25° C. with rotary mechanical shaking (2 inch radius at 280 cycles per minute), after which about 10% (v./v.) transfers are made to 250 ml. flasks each containing 50 ml. of fresh sterile medium of the same composition. The inoculated flasks are incubated for 48 hours after which time 12.5 mg. of progesterone in the form of a sterile 2.5% methanolic solution (250 gamma of steroid per ml. of medium) is added to each flask. The flasks are further incubated for 48 hours, after which the cultures are harvested and pooled and the contents filtered through a Seitz pad and then washed with water to give a final volume of filtrate and washings of about 2500 ml. The filtrate is extracted with methyl isobutyl ketone and the extracts chromatographed in a toluene-propylene glycol system [by the method of A. Zaffaroni and R. B. Burton, J. Biol. Chem. 193, 749 (1951)]. The paper chromatogram shows the presence of 7α-hydroxyprogesterone in the methyl isobutyl ketone extract.

EXAMPLE 3

*Preparation of 7α-hydroxycortexolone*

The fermentation procedure of Example 2 is followed identically except that instead of progesterone, cortexolone (250 ml.) is employed as the steroid substrate. Following the extraction procedures of Example 2 the fermentation broth is filtered and the filtrate extracted with methyl isobutyl ketone. The methyl isobutyl ketone extract is chromatographed in a benzene-ethanol-water system (2:1:2) [using a system analogous to those described by Bush in Biochem. J. 50, 370 (1952)]. The paper chromatogram shows the presence in the methyl isobutyl ketone extract of 7α-hydroxycortexolone.

EXAMPLE 4

*Preparation of 7α-hydroxycortisone*

Following the fermentation, extraction and chromatographic procedures described in Example 3 with the exception that 250 gamma per ml. of cortisone is employed as the steroid substrate, a product is obtained which is shown by paper chromatography, to contain 7α-hydroxycortisone.

EXAMPLE 5

*Preparation of $\Delta^{1,4}$-pregnadiene-7α,17α,21-triol-3,20-dione*

Following the procedure of Example 3 with the exception that 200 gamma per ml. of $\Delta^{1,4}$-pregnadiene-17α,21-diol-3,20-dione is employed as the steroid substrate, a product is obtained which is shown by paper chromatography to contain $\Delta^{1,4}$-pregnadiene-7α,17α,21-triol-3,20-dione.

EXAMPLE 6

*Preparation of 9α-fluoro-7α-hydroxyhydrocortisone*

Following the fermentation extraction and chromatographic procedure described in Example 3 with the exception that 9α-fluorohydrocortisone is employed as the steroid substrate, a product is obtained which is shown by paper chromatography to contain 9α-fluoro-7α-hydroxyhydrocortisone.

EXAMPLE 7

*Preparation of 7α-hydroxyhydrocortisone*

Following the procedure of Example 3 with the exception that 250 gamma per ml. of hydrocortisone is employed as the steroid substrate a product is obtained which is shown by paper chromatography to contain 7α-hydroxyhydrocortisone.

EXAMPLE 8

*Preparation of 7α-hydroxyprednisolone*

Following the fermentation extraction and chromatographic procedure described in Example 3 with the exception that 250 gamma per ml. of prednisolone is employed as the steroid substrate, a product is obtained which is shown by chromatographic analysis to contain 7α-hydroxyprednisolone.

EXAMPLE 9

*Preparation of $\Delta^4$-androstene-7α-ol-3,17-dione*

Following the procedure of Example 3 with the exception that 250 gamma per ml. of $\Delta^4$-androstene-3,17-dione is used as the steroid substrate, a product is obtained which is shown by paper chromatography to contain $\Delta^4$-androstene-7α-ol-3,17-dione.

This invention may be variously otherwise embodied within the scope of the appended claims.

What is claimed is:

1. The process for 7α-hydroxylating steroids which comprises subjecting a 7-unsubstituted steroid selected from the group consisting of those of the androstane and pregnane series to the action of enzymes of *Diplodia natalensis* under oxidizing conditions and recovering the 7α-hydroxysteroid thus formed.

2. The process of claim 1 in which the 7-unsubstituted steroid is $\Delta^4$-pregnene-17α,21-diol-3,20-dione.

3. The process of claim 1 in which the 7-unsubstituted steroid is progesterone.

4. The process of claim 1 in which the 7-unsubstituted steroid is hydrocortisone.

5. The process of claim 1 in which the 7-unsubstituted steroid is cortisone.

6. The process of claim 1 in which the 7-unsubstituted steroid is 9α-fluorohydrocortisone.

No references cited.